United States Patent [19]

Norling

[11] Patent Number: 4,592,234

[45] Date of Patent: Jun. 3, 1986

[54] SUSPENSION SYSTEM FOR A TRANSDUCER

[75] Inventor: Brian L. Norling, Seattle, Wash.

[73] Assignee: Sundstrand Data Control, Inc., Redmond, Wash.

[21] Appl. No.: 619,021

[22] Filed: Jun. 11, 1984

[51] Int. Cl.$^4$ ........................................... G01P 15/13
[52] U.S. Cl. .................................... 73/517 B; 73/497; 73/514
[58] Field of Search ................. 73/514, 517 R, 517 B, 73/497, 652, 654

[56] References Cited

U.S. PATENT DOCUMENTS 3,702,073  11/1972  Jacobs .............................. 73/517 B
4,250,757  2/1981  Hanson ............................. 73/517 B

FOREIGN PATENT DOCUMENTS 498557  6/1976  U.S.S.R. ........................... 73/517 R

*Primary Examiner*—Stewart J. Levy
*Assistant Examiner*—John E. Chapman, Jr.
*Attorney, Agent, or Firm*—Christensen, O'Connor, Johnson & Kindness

[57] ABSTRACT

Thermally induced stress between a quartz proof mass and the metal stators which constrain it are relieved by a suspension system employing pliant members. Contact points between the proof mass and the stators are formed by raised pads on the proof mass which contact beams formed in the stators. Each beam has an axis of pliancy, which axis extends through a fixed, stable contact point between the proof mass and the stators, the beam being otherwise rigid to applied forces along axes orthogonal to the axis of pliancy. The resulting suspension system exhibits compliance to thermally induced loads while providing rigidity in response to seismic loads.

In alternative embodiments of the suspension system, the pliant beams are positioned to provide temperature compensation for compounds of the transducer.

28 Claims, 19 Drawing Figures

SUSPENSION SYSTEM FOR A TRANSDUCER

BACKGROUND OF THE INVENTION

The present invention pertains to the transducer art and, more particularly, to a suspension system for use with very high performance transducers such as accelerometers.

An example of a prior art accelerometer design with high performance potential is described in U.S. Pat. No. 3,702,073, invented by Jacobs, issued Nov. 7, 1972, and assigned to the same assignee as the present application. This design is comprised of three primary components, namely, a proof mass assembly which is supported between upper and lower stators. The proof mass includes a moveable flapper, or reed which is suspended via flexure elements to an outer annular support member. The flapper and outer annular support member are commonly provided as a unitary, fused quartz piece.

Arcuate capacitor pick off plates are formed on the upper and lower surfaces of the flapper by means of gold deposition. In addition, upper and lower force restoring, or torquer coils are also mounted to the upper and lower surfaces of the flapper. Each torquer coil is wound on a cylindrical core and is positioned on the flapper such that the longitudinal axis of the cylinder coincides with a line which extends through the center, and is normal to the top and bottom surfaces of the proof mass assembly.

A plurality of mounting pads are formed, by acid etching and subsequent deposition of a malleable metal such as gold, at spaced intervals around the upper and lower surfaces of the outer annular support member. These contact pads mate with planar surfaces provided on the upper and lower stators when the unit is assembled.

Each stator is generally cylindrical, having a bore provided through its planar surface. Contained within the bore is a permanent magnet. The bore and permanent magnet are configured such that the torquer coil of the proof mass assembly fits within the bore, with the permanent magnet being positioned within the cylindrical form of the torquer coil. Thus, each stator permanent magnet is in magnetic circuit configuration with a magnetic field as produced by a current flowing through the corresponding torquer coil.

Also provided on the planar surface of the stators are capacitive plates configured to form capacitors with the upper and lower capacitor pick off plates on the proof mass assembly. Thus, movement of the flapper with respect to the upper and lower stators in a differential capacitance change between the capacitors formed at the upper and lower surfaces of the flapper.

In operation, the accelerometer unit is affixed to the object to be monitored. Acceleration of the object results in pendulous, rotational displacement of the flaper with respect to the outer annular support member and the upper and lower stators. The resulting differential capacitance change caused by this displacement may be sensed by suitable circuitry. The circuitry then produces a current which, when applied to the torquer coils, tends to return the flapper to its neutral position. The magnitude of the current required to "restore" the flapper is directly related to the acceleration of the accelerometer.

Accelerometers of the type described in the Jacobs patent may be subject to thermal stresses due to mismatches in the coefficient of thermal expansion of connecting materials. The use of symmetrical geometry stators tends to cancel out most of the resultant undesirable thermal strains. However, manufacturing tolerances and material instabilities may create stresses which deform, to some extent, the flapper sensing element of the accelerometer. In addition, the coefficient of thermal expansion of the proof mass, including the outer annular support member (which is preferably formed of fused quartz), is typically less than the coefficient of thermal expansion of the upper and lower stators (which are preferably formed of a metal alloy). Hence, over the operating temperature of the accelerometer, thermal stresses are created at the contact points between the proof mass assembly and the stators.

The above stresses are transmitted into the outer annular support member of the proof mass. Imperfections in the outer annular support member of the flexures may convert the resultant strain into output bias errors. In addition, the thermal stresses may result in creep and discontinuous movements at the interface of the proof mass assembly and the stators. Such undesired movements modulate the strains on the proof mass and may produce significant hysteresis errors in accelerometers intended for high performance applications.

Further, the above thermal stresses may result in movement of the torquer coils with respect to the stator permanent magnets. Such movement may produce a flux density variance between the field produced by the coils and the permanent magnets, thereby altering the sensitivity of the accelerometer. This effect is repeatable and therefore is an error source only in systems which do not compensate for stable temperature effects.

Subsequent to the Jacobs patent, attempts have been made to reduce the above described thermal stresses. For example, stators have been constructed from materials having a coefficient of thermal expansion very close to that of quartz, thereby reducing thermal stress between the proof mass assembly and the stators.

Despite such improvements, it is desirable to identify yet further means to minimize sources of inaccuracy, particularly for accelerometer applications requiring very high precision.

SUMMARY OF THE INVENTION

It is desirable, therefore, to provide a suspension system for relieving the thermally induced stresses created between the proof mass and the stators of a transducer assembly.

Briefly, according to the invention, a transducer assembly comprises a proof mass, including a mass element suspended from a support member for movement with respect thereto, and a stator means for supporting the proof mass. A mounting means mounts the proof mass to the stator. The mounting means includes at least one pliant element positioned to provide the mechanical connection between adjacent points on the proof mass and the stator. The axis of pliancy of the pliant element is predeterminedly aligned to provide strain relief between the proof mass and the stator.

BRIEF DESCRIPTION OF THE DRAWINGS

FIGS. 16a, 16b illustrate alternative constructions of the pliant element, here formed as an independent component which may be mounted in the transducer assembly; and FIG. 17 is a top plan view of a stator employing the component pliant element of FIG. 16a.

DETAILED DESCRIPTION

Figure 1:
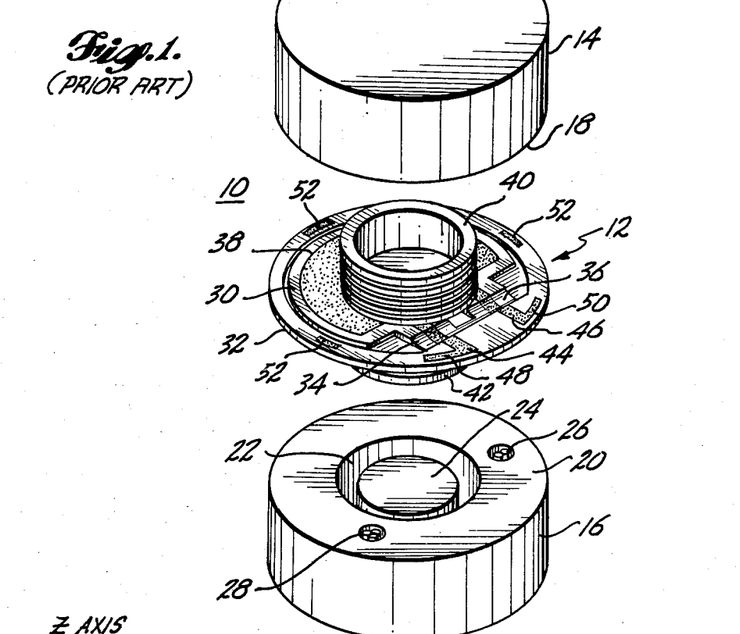
FIG. 1 is an exploded view of a prior art accelerometer assembly.

FIG. 1 is an exploded view of an accelerometer of the general type described in U.S. Pat. No. 3,702,073 to Jacobs. Here, an accelerometer, indicated generally at 10, is comprised of three principal components, namely, a proof mass assembly, indicated generally at 12, and upper and lower stator, or magnet units 14, 16, respectively. The stators 14, 16 are cylindrical, having opposed planar surfaces 18, 20, respectively, which are adapted to mate with the proof mass assembly 12. A bore, such as bore 22, is provided in the central portion of each stator 14 and 16, such that a centrally located permanent magnet may be affixed or formed therein. The bore 22 in lower stator 16 is shown receiving a cylindrical permanent magnet 24, whereas the corresponding bore and permanent magnet of the upper stator are not shown. Electrical contacting posts 26 and 28 are positioned within bores that are spaced-apart from one another in the planar surface 20 of the lower stator 16. Upon assembly of the accelerometer, the posts 26 and 28 provide electrical connections to contact pads on the proof mass assembly.

The proof mass assembly 12 is comprised of a mass element, commonly called a flapper or reed 30. Flapper 30 is generally circular and is connected to an outer annular support member 32 through a pair of flexure elements 34 and 36. The flapper 30, outer annular support member 32 and flexure elements 34 and 36 are, preferably, formed as a unitary, fused quartz piece.

An arcuate capacitor pick off plate 38 is formed, as by gold deposition, on the upper surface of flapper 30. A corresponding capacitor pick off plate (not shown) extends arcuately along the outer periphery of the lower surface of flapper 30.

A pair of torquer coils 40 and 42 mount to the upper and lower surfaces, respectively, of the flapper 30. Each torquer coil is comprised of multiple windings of copper wire on a cylindrical core. The torquer coils 40 and 42 are mounted to the flapper 30 such that the longitudinal axis of each torquer coil core is coincident with a line extending through the center of the proof mass assembly 12, and normal to the upper and lower surfaces of the flapper 30.

Electrical connections to the capacitor pick off plates, such as plate 38, and to the upper and lower torquer coils 40 and 42 are provided via thin film pick off leads 44 and 46 which extend over the flexure elements 34 and 36 to contacting pads 48 and 50 formed on the outer annular support member 32.

A series of contacting pads 52 are formed at spaced angular intervals around the upper surface of the outer annular support member 32. Corresponding contact pads (not shown) are formed on the lower surface of support member 32. The contact pads are, typically, formed by acid etch.

Upon assembly of the accelerometer 10, the proof mass assembly 12 is supported between the upper and lower stators 14 and 16 at contact points defined by the three raised quartz contact pads 52.

A pair of capacitors is formed by the assembled accelerometer 10. The first capacitor has spaced-apart, substantially parallel plates comprised of the upper capacitor pick off plate 38 and the planar surface 18 of the upper stator 14. The second capacitor is formed by the capacitor pick off plate that is located on the lower surface of the flapper (not shown) and the planar surface 20 of the lower stator 16. Deflection of the flapper 30 with respect to the outer annular support 32 and the planar surfaces 18 and 20 of the upper and lower stators 14 and 16 produces a differential change in the capacitance of these two capacitors.

Assembly of the accelerometer 10 also results in the torquer coils 40 and 42 being coaxially received within annular cavities formed between the permanent magnets, such as magnet 24, and the wall of the bores, such as bore 22.

In operation, accelerometer 10 is affixed to the object whose acceleration is to be determined. Acceleration of the object results in a pendulous, rotational displacement of the flapper 30 with respect to the outer annular support member 32 and the stators 14 and 16, with resultant differential change in the capacitance of the two capacitors. The change in capacitance is sensed by suitable sense circuitry (not shown). The sense circuitry, in the known servo manner, produces a current which is passed to the windings of the torquer coils 40 and 42. The current results in a magnetic field which, in combination with the stator permanent magnets, such as magnet 24, produces a force tending to "restore" the flapper 30 to its rest position. This current is directly related to the acceleration of the accelerometer and, as such, may be used to produce an acceleration reading.

As previously mentioned, the prior art accelerometer design of FIG. 1 is subject to hysteresis and instabilities due to thermally induced stress and strain between the proof mass assembly 12 and the upper and lower stators 14 and 16. For example, the coefficient of thermal expansion of a quartz proof mass assembly 12 is less than that of the stators 14 and 16, which are generally constructed of an alloy such as the commercially available alloy Invar. As a result, thermal stresses between the proof mass assembly 12 and stators 14 and 16 are created over the operating range of the accelerometer.

The above described thermal stresses, transmitted through the pads 52, tend to distort the outer annular support member 32. Imperfections in the outer annular support member 32 and the flexures 34, 36, may transform this distortion into displacement of the flapper 30. This distortion produces a capacitor pick off plate displacement which is sensed by servo detector circuitry (not shown). The servo detector circuitry responds by producing a current through the torquer coils 40, 42 thereby repositioning the flapper 30. This position change causes flexures 34, 36 to produce an opposing moment which creates a bias offset error current in the accelerometer's output.

In addition, such stresses may produce a misalignment between the torquer coils 40, 42 and the magnetic pole pieces of the stator magnets, such magnet 24, thereby altering the sensitivity of the accelerometer.

Figure 2:
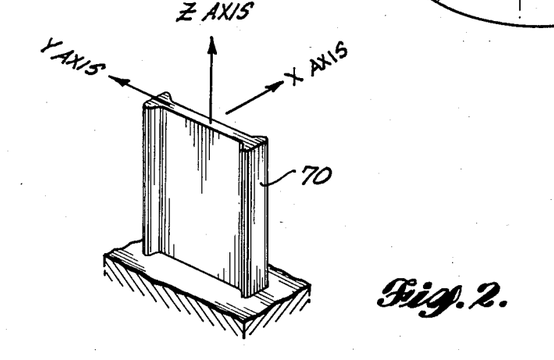
FIG. 2 is a perspective view of one type of pliant element which can be used in a transducer suspension system constructed in accordance with the invention.

The present invention provides a means to relieve thermally induced flapper-to-stator stresses through the use of a suspension system which incorporates pliant elements. In addition, the pliant elements provide rigid support of the proof mass against seismic loads. FIG. 2 illustrates a preferred embodiment of such a pliant element, here comprised of a beam member 70. Beam member 70 is, preferably, formed in the upper and lower stators of the accelerometer, i.e. formed as a unitary portion of each stator, and provides the mechanical contact between the stators and the proof mass assembly. Regardless of the method of construction, beam 70 is designed to support column loads in the Z axis, and, in a plane containing the upper surface of beam 70, be pliant to applied forces along the X axis, while being relatively rigid to applied forces along the Y axis.

A characteristic of homogeneous materials, such as fused quartz and the metal alloy Invar, is that they expand equally in all directions in response to thermal stresses. Thermal expansion will cause a given point on such a material to move directly, radially away from a reference point—there being no side component of motion. The present invention makes use of this characteristic by aligning the pliant, X axis of each beam with this pure radial motion. The rigid Y axis, being orthogonal to the X axis, remains completely without strain in the presence of pure thermal expansion. Assuming the beams, such as beam 70, to be infinitely rigid in their Y axes, then the intersection point of the X axes of two or more beams defines a fixed, or stable point, i.e., a point of no relative motion, between the proof mass assembly and the stators independent of whether the proof mass assembly and stators are in direct contact at said stable point.

As described hereafter, the beams, such as beam 70 are provided in a configuration such that their pliant X axes intersect at a single, selected point for purposes described below. This point will, therefore, be a fixed or stable point between the proof mass assembly and the stators, whereas the beam is free to deform directly along its X axis to compensate for thermally induced stains.

Figures 3, 3A, 4:
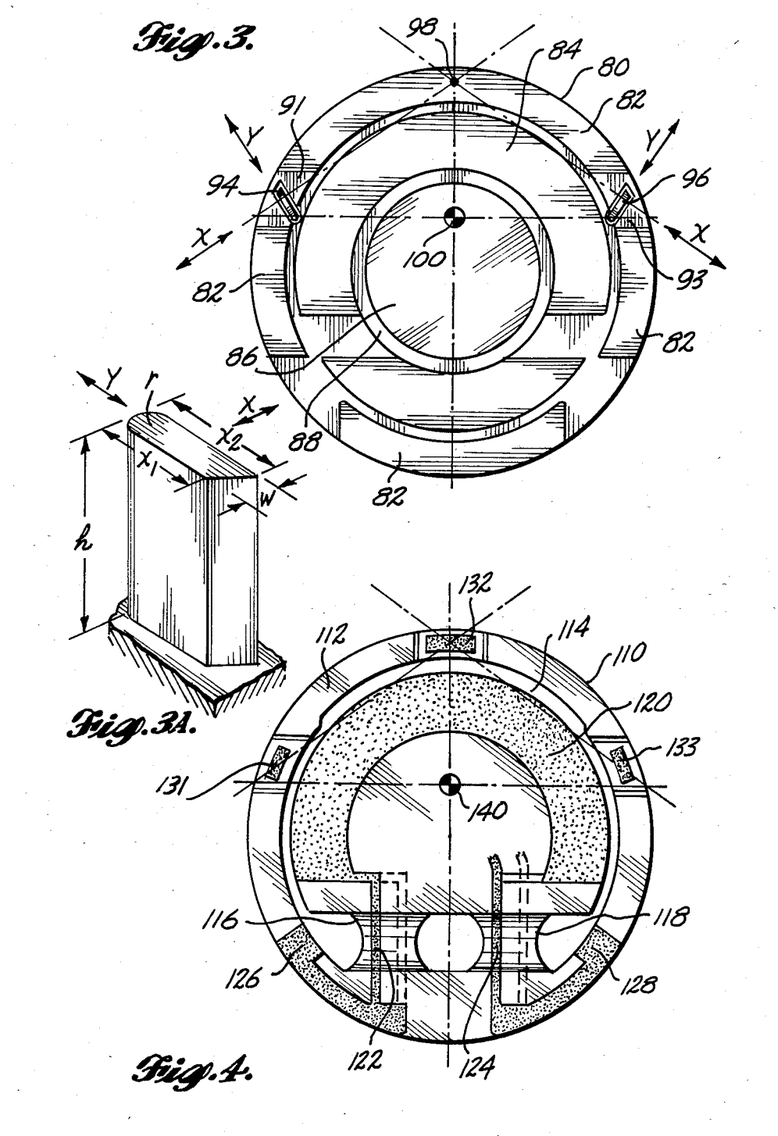
FIG. 3 is a plan view of an improved stator employing pliant elements according to the invention.
FIG. 3a is a perspective view of a pliant element, which is alternative to the pliant element shown in FIG. 2, for use in the arrangement of FIG. 3.
FIG. 4 is a proof mass assembly for use in conjunction with the stator of FIG. 3.

FIG. 3 is a plan view of a stator planar surface and illustrates one embodiment of the suspension system of the present invention. This stator is specifically designed for use in an accelerometer of the type described with respect to FIG. 1.

Stator 80 is, preferably, machined from an alloy of the type exhibiting a low coefficient of thermal expansion with high magnetic permeability, such as the commercially available alloy Invar, with raised outer ring portions 82 and a raised capacitive plate portion 84. The capacitive plate portion 84 is arcuate, configured to be aligned with the capacitive plate portion of a proof mass assembly of the type depicted in FIG. 4.

Stator 80 includes a magnetic pole piece 86 that is coaxially positioned within a cylindrical bore 88. As with the FIG. 1 construction discussed above, stator 80 is designed such that a torquer coil (not shown) of the proof mass assembly is received between the wall of bore 88 and pole piece 86 such that the longitudinal axis of the torquer coil is coincident with the longitudinal axis of the pole piece 86.

Two undercut portions 91, 93 are formed at predetermined circumferentially spaced-apart locations on the ring 82. Beam members 94 and 96 extend above undercut portions 91 and 93, to the level of ring 82. Each beam member is designed such that its pliant X axis intersects a point 98 where the pad 132 contacts the outer ring portion 82. Further, each beam 94, 96 is designed such that it is rigid to applied forces along both its Y axis, as shown, and its Z axis (extending out of the paper).

In this, the preferred embodiment of the invention, the beam members 94 and 96 were formed in the ring 80 by means of electron discharge machining. It should be understood, however, that any other means for forming beams 94, 96, are within the scope of the invention.

FIG. 3a is a perspective view of each of the beam members 94 and 96 formed in one construction of the invention. In this construction, each stator had a diameter of 2.222 cm (0.875 inches), a depth of 0.767 cm (0.302 inches) and was made of the alloy commercially available as Invar. The corresponding proof mass assembly (FIG. 4) had a diameter of 2.222 cm (0.875 inches), a thickness of 0.762 cm (0.030 inches) and was formed of fused quartz. Each beam member had a height h of 0.686 cm (0.270 inches), a minor extent $X_1$ of 0.201 cm (0.079 inches), a major extent $X_2$ of 0.229 cm (0.090 inches), a radius r of 0.022 cm (0.0085 inches), and a width w of 0.043 cm (0.017 inches).

FIG. 4 illustrates a proof mass 110 configured for use with the stator 80 of FIG. 3. Proof mass 110 is, preferably, formed of fused quartz and includes an outer annular support member 112 and a flapper 114. The flapper 114 is hinged within support member 112 via a pair of flexures 116 and 118. An arcuate capacitive plate pick off portion 120, preferably formed by gold deposition, is formed on the flapper 114. A similar capacitive pick off plate (not shown) is formed on the opposite side of flapper 114. Electrical connections to the capacitive plate 120 are made via thin film leads 122 and 124 which extend along the surface of flexure elements 116 and 118, respectively, to contact pads 126 and 128 provided on the support member 112. Three raised pads 131-133 are provided at spaced-apart locations on the support member 112. These pads are, preferably, formed by acid etch with subsequent deposition of a malleable metal, such as gold. The pads 131-133 are positioned to be in contact with the corresponding beam members 94 and 96 and stable point 98 of the stator, as shown in FIG. 3.

Preferably, the pads 131 and 133 and the corresponding beam members 94 and 96 are positioned such that the contact point therebetween closest to the center of the stator is on a line extending through the centroid 140 of the capacitive plate 120. As is described in U.S. Pat. No. 4,250,757, issued Feb. 17, 1981, and assigned to the same assignee as the present application, by so positioning the contact points between the proof mass 110 and the stator, such as stator 80 of FIG. 3, bias errors resulting from the securing of the annular support member 112 between the stators may be reduced. Preferably, in accordance with said patent, the area of the leads 122 and 124 is included in determining the centroid 140.

In addition, pad 132 and stable point 98 are positioned on a line which extends through the center of stator 80 and is orthogonal to the line extending through the other contact points.

Figures 5, 6:
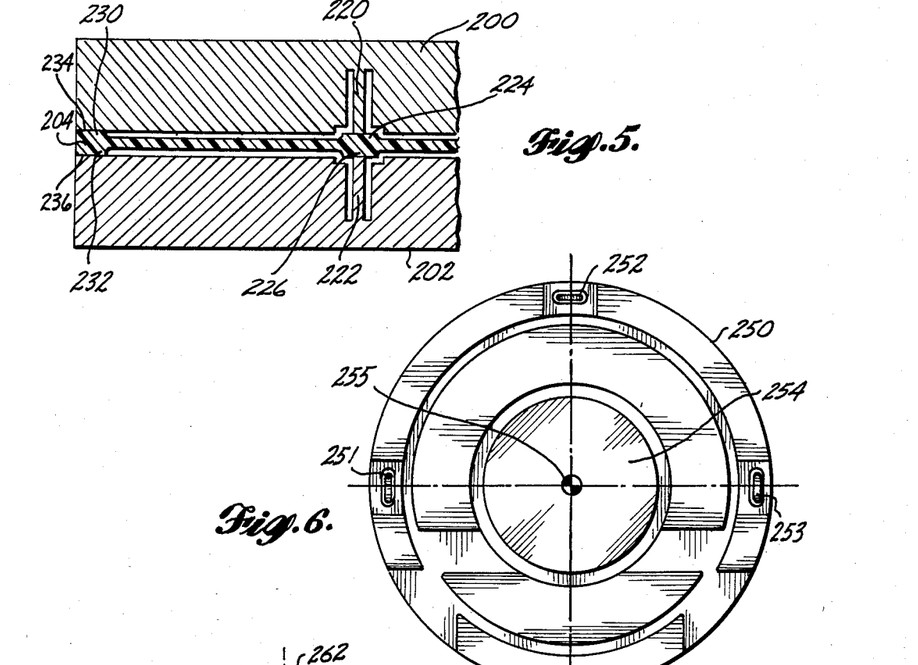
FIG. 5 is a cross-sectional view of an assembled accelerometer employing the stator and proof mass assembly of FIGS. 3 and 4, respectively.
FIG. 6 illustrates an alternative positioning of the pliant elements in the stator to maintain a torquer coil in fixed spatial relationship with the stator throughout the operating temperature range of the accelerometer.

FIG. 5 is a cross-sectional view of an accelerometer assembly having stators 200 and 202 formed in accordance with FIG. 3 and a proof mass 204 formed in accordance with FIG. 4. As shown, the contact points between the stators 200 and 202 and the proof mass 204 are established at the interface between the beam elements 220 and 222 formed in the stators 200 and 202, respectively, and the raised pads 224 and 226 formed on the upper and lower surface, respectively, of proof mass 204. A similar contacting arrangement exists between the other set of beam members and corresponding raised pads (not shown). The final contacting point is established at the interface between the raised pads 230 and 232 on the upper and lower surfaces of proof mass 204 and the aligned contacts 234 and 236 at the fixed point location of stators 200 and 202.

In operation, as the accelerometer of FIG. 5 is subjected to thermal strain due to the differing coefficients of thermal expansion between the proof mass 204 and the stators 200 and 202, the beam members 220 and 222 will deform directly along their X axes (see FIG. 3) in a manner to reduce stress on the proof mass 204. The contact point between pads 230 and 232 and reference points 234 and 236 will, however, remain fixed. Moments about this fixed point caused by seismic loading are, however, resisted due to the stiffness, or rigidity of the beams 220 and 222 directly along their Y axes (see FIG. 3). Thus, the resulting suspension system provides maximum compliance to thermally induced strains, while providing rigid support of the proof mass 204 against seismic loads in any direction. The compliance reduces the stress on the pad-beam interface at the temperature extremes, thereby reducing the potential for creep and slippage. Inasmuch as the pliant beam members 220 and 222 do not impart side loads to the proof mass 204 when they are deformed by thermal stresses, the susceptibility of the accelerometer to thermally induced errors is, accordingly, reduced.

It will be noted that the location of the stable, fixed point provided by the present suspension system is independent of the location, or number of pliant members. Rather, this point is fixed as a function only of the axis of pliant member orientation. Thus, the present suspension system is capable of being adapted to numerous configurations for providing various functions.

Figure 7:
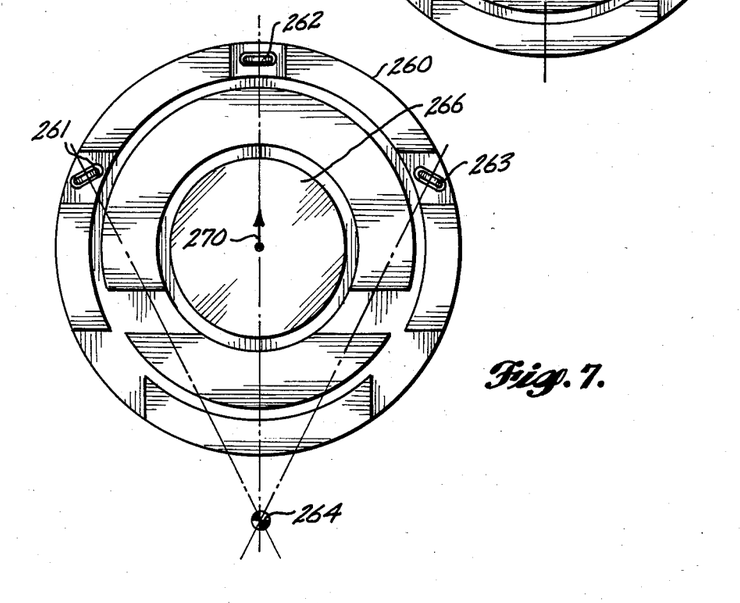
FIG. 7 is a plan view of an alternative arrangement of the pliant elements positioned to provide temperature compensation for thermally induced variations in the flux density characteristic of a torquer coil and magnetic pole piece configuration.

FIGS. 6 and 7 illustrate two alternative embodiments of the suspension system for use with an accelerometer of the type generally illustrated in FIG. 1. Shown are the stator configurations only, it being understood that corresponding proof mass assemblies of the type shown in FIG. 4, modified by relocating the contact pad positions to mate with the pliant beam members of each stator, are required for a completed unit.

FIG. 6 is a plan view of a stator 250 having three pliant beam members 251-253. The pliant axes of the beam members 251 and 253 are colinear on a first line which extends through the geometric center 255 of the surface of stator 250 and, thus, the longitudinal axis of the magnetic pole piece 254. The pliant axis of beam member 252 is aligned on a second line extending through the stator 250 geometric center 255, which second line is orthogonal to the first line. In this embodiment, inasmuch as the center of the pole piece 254 is the fixed, stable point, the pole piece will tend to remain coaxially spaced within the corresponding torquer coil (not shown), thereby minimizing any misalignment effects between the pole piece and the torquer coil caused by thermal stresses. As a result, any changes in the magnetic circuit relationship between the pole piece and torquer coil over the operating temperature of the accelerometer will be substantially reduced.

It should be understood that the same function could be obtained by placing the beam members 251-253 at any positions on the stator 250 as long as the X axes thereof are aligned with the geometric center 255. For example, in an alternative embodiment of the stator 250, the first and third pliant beam members 251, 253, respectively, could be positioned on a line which extends through the centroid of the capacitive plate of an associated proof mass assembly (not shown) to reduce bias errors as discussed above.

FIG. 7 illustrates a second alternative embodiment of a stator 260. Here, three pliant elements 261-263 are arranged such that their axes of pliancy converge at a point 264 that lies outside the boundary surface of stator 260 and, as such, is "free floating." It has been found that as the temperature of the accelerometer unit is raised, the magnetic flux density in the annular gap between the magnetic pole piece, such as pole piece 266, and its corresponding torquer coil (not shown) is reduced. The reduced flux density results in an increased accelerometer sensitivity, or scale factor. To compensate for this undesired flux density-temperature characteristic, the fixed point 264 is selected such that the magnetic pole piece 266 exhibits a defined movement in the direction generally indicated by arrow 270 with increasing temperature. This results in a repositioning of the pole piece 266 with respect to the corresponding torquer coil and, thus, a flux density variance. By careful design, the flux density change caused by repositioning of the magnetic pole piece (due to the selection of fixed point 264) and a corresponding change in the moment arm between the center of force and the effective hinge point of the flapper may be made to substantially compensate for flux changes due to the temperature characteristic of flux density in the magnetic gap. In this way, the embodiment of FIG. 7 provides self-temperature compensation for the flux characteristic and, hence, the sensitivity (scale factor) of the accelerometer.

It is also to be noted that the first and third beam members 261, 263, respectively, are positioned on a line which extends through the centroid of the capacitive pick off plate of an associated proof mass assembly (not shown) to reduce bias errors as discussed above.

Figure 8:
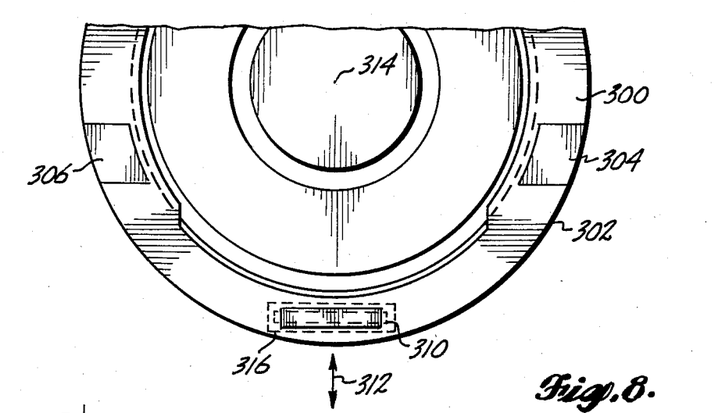
FIG. 8 is a plan view of an alternative arrangement of a stator illustrating the use of a single pliant element.

FIG. 8 is a top plan view illustrating a transducer assembly construction which utilizes a single pliant element. Shown is a proof mass assembly 300 which is aligned with a stator 302. A pair of raised pads 304, 306 on proof mass assembly 300 mate with corresponding surfaces on the stator unit 302. Formed within stator unit 302 is a single pliant element 310, here formed integrally in stator 302 as a beam element. Beam element 310 has a pliant axis indicated by arrow 312. Pliant axis 312 is aligned with the geometric center point 314 of the proof mass 300 and stator unit 302 assembly. A pad 316 formed in proof mass assembly 300 is in mating contact with the top surface of the beam element 310.

In the single pliant element construction of FIG. 8, no fixed, stable point is produced, as in prior discussed configurations, inasmuch as there is no intersection of the pliant axes of two pliant members. However, the single pliant beam element 310 does flex in response to thermal stresses created between the proof mass assembly 300 and stator unit 302 to minimize stresses and strains created between these components, thereby reducing accelerometer errors.

Figure 9:
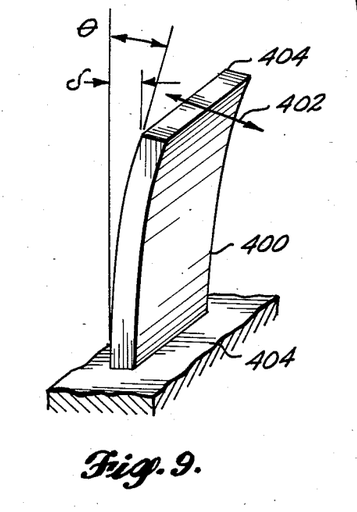
FIG. 9 is a perspective view of a pliant element illustrating deflection of the end thereof which mates with the proof mass assembly.

FIG. 9 is a perspective view of a beam member type pliant element as described hereinabove with respect to FIGS. 3, 5, 6, 7 and 8 illustrating deflection of the beam 400 along its pliant axis 402 to relieve stresses between the stator 404 to which it is attached at one end and a contact pad on a proof mass (not shown). The top surface 404 of beam 400 is shown deflected a distance $\delta$ and rotated through an angle $\theta$. The deflection $\delta$ of the beam element 400 creates a condition in which the top surface 404 attempts to rotate. The proof mass pad (not shown) prevents this rotation by producing a balancing torque. This balancing torque is, in turn, balanced by an equal and opposite torque generated by the opposing beam element (not shown) which mates with the top surface of the proof mass pad. Any unbalance in the opposing torques applied by the lower beam element 400 and the upper beam element (not shown) on the proof mass pad (not shown) will cause a deflection of the proof mass and may produce corresponding transducer output errors.

Figure 10:
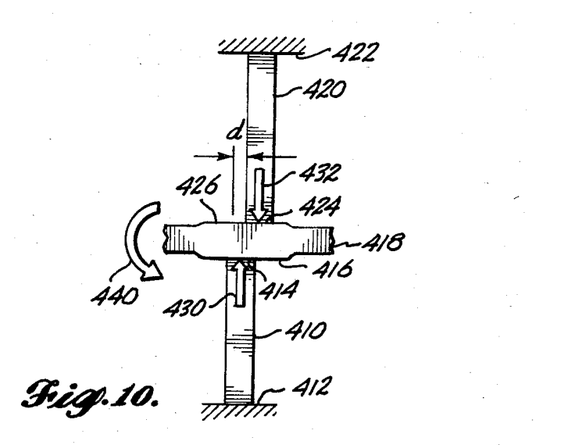
FIG. 10 is a side view of upper and lower pliant elements mating with pads on a proof mass assembly, and illustrates misalignment of the pliant elements creating a torque in the proof mass.

FIG. 10 illustrates another source of transducer error produced by the use of opposing beam elements. Here, shown in cross section is a lower beam element 410 which projects upwardly from the lower stator 412 and has a top surface 414 which mates with the lower surface 416 of the proof mass assembly 418. An upper beam element 420 projects downwardly from an upper stator 422 and has a surface 424 which mates with the upper surface 426 of the pad on the proof mass assembly 418. In assembly, a clamping force is applied between the stators 412, 422, thereby producing a preload compression force on the beam elements 410, 420 as indicated by force arrows 430, 432, respectively. The longitudinal axes of the beam elements 410, 420 are shown misaligned by a dimension d. The effect of this misalignment is a torque, indicated by arrow 440, in the proof mass assembly 418. Possible changes in the preload over time or temperature will change the value of the torque on the proof mass assembly thereby producing corresponding transducer errors.

The various embodiments of the pliant elements as shown in FIGS. 11-16 are designed to minimize, or eliminate the problems discussed with respect to FIGS. 9 and 10.

Figure 11:
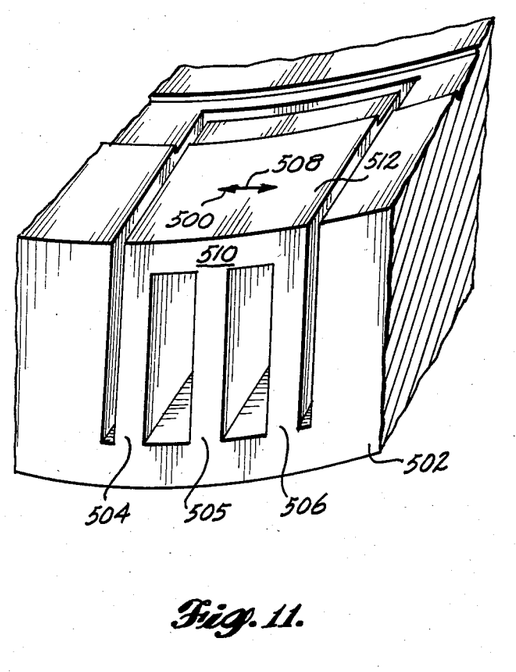
FIG. 11 is a perspective view of an alternative embodiment of the pliant element which is formed integrally with the stator and comprises three parallel beams sharing a common top portion having a top surface which mates with the proof mass assembly.

FIG. 11 illustrates an alternative construction of the pliant element. Here, the pliant element, indicated generally at 500, is formed integrally within the stator unit 502. Pliant element 500 is formed of three predeterminedly spaced parallel beam members 504-506. The beam members 504-506 are designed to be pliant along an axis 508 which is perpendicular to the major surfaces of beam members 504-506. The beams 504-506 are rigid in their two primary axes orthogonal to the pliant axis 508.

Beam members 504-506 project upwardly from a recess in stator 502 and join in a common top member 510. Top member 510 has a top surface 512. Top surface 512 abuts with the lower surface of the proof mass contacting pad (not shown). A corresponding pliant element (not shown) is provided projecting downwardly from the upper stator (not shown) to contact the upper surface of the proof mass contacting pad (not shown).

A particular feature of the pliant element 500 of FIG. 11 is that the top surface 512 of the common member 510 remains substantially parallel to the opposing surface of the proof mass pad (not shown) over deflection of the beam members 504-506 in their pliant axis. As such, the pliant element of FIG. 11 induces a minimum torque and resultant rotational deflection in the proof mass assembly. In addition, the wide surface area of top surface 512 and wide spacing of beam members 504 and 506 minimizes torque applied to the proof mass assembly due to axial misalignment between the lower pliant element 500 and the upper pliant element (not shown) on the proof mass assembly pad.

The construction of FIG. 11, therefore, reduces errors in the transducer assembly caused by deflection or axial misalignment of the pliant elements.

Figure 12:
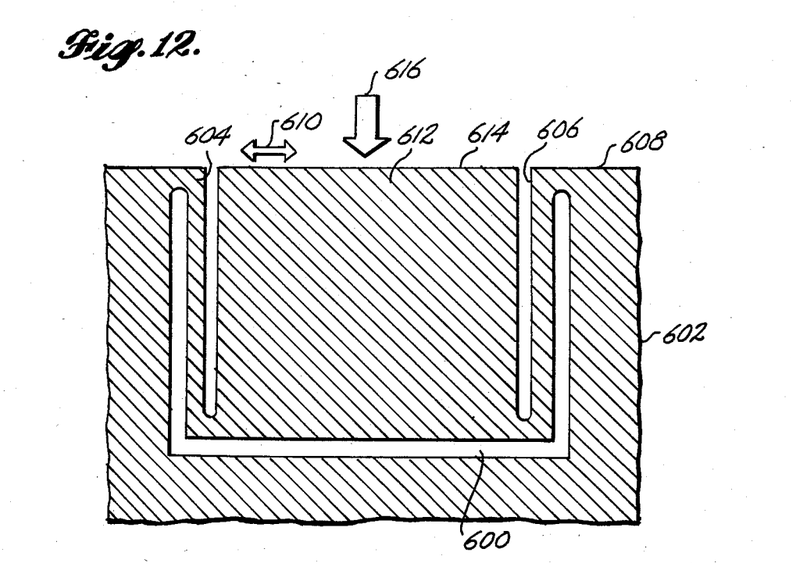
FIG. 12 is a cross sectional view of an alternative construction of the pliant element wherein beams under tension carry a contacting element, the upper surface of which mates with the proof mass assembly and moves in parallel with respect thereto in response to deflection of the beam elements.

FIG. 12 is a cross-sectional view of an alternative construction of the pliant element. Here, a recess 600 is formed in the stator 602. First and second beam members 604, 606 are attached at the upper surface 608 of the stator and project vertically towards the bottom of recess 600. The beam members 604, 606 are designed to be pliant in a single axis, here indicated by arrow 610.

The projecting ends of the beams 604, 606 are attached to the ends of a generally cubic-shaped contacting element 612. Contacting elements 612 is, therefore, suspended within recess 600 by beam 604, 606. The upper surface 614 of contacting element 612 abuttingly mates with the lower surface of the proof mass contacting pad (not shown). This produces a downward force, indicated by arrow 616, on the upper surface of contacting element 612. It will be understood that in a complete construction, an upper stator is provided with a similar, opposing contacting element which mates with the upper surface of the proof mass assembly contact pad.

As with the embodiment of FIG. 11, the upper surface 614 of contacting element 612 remains in parallel alignment with the proof mass contacting pad over deflections of the beams 604, 606 along their pliant axis 610 to reduce or eliminate induced torques on the proof mass assembly. In addition, the wide surface area of the top surface 614 of contacting element 612 along with the wide separation of the supporting beams reduces torques on the proof mass assembly caused by axial misalignment between contacting element 612 and the corresponding, opposing contacting element of the upper stator (not shown).

A further feature of the embodiment shown in FIG. 12 is that the beams 604, 606 are under tension, as opposed to the compression applied to the beam elements as discussed herein before. Thus, the design of FIG. 12 eliminates all potential for buckling of the beams 604, 606 to which beams under compression are subject. Increases in the downward force (arrow 616) tend to augment structural stability rather than creating instabilities as a columnar structure.

Figure 13:
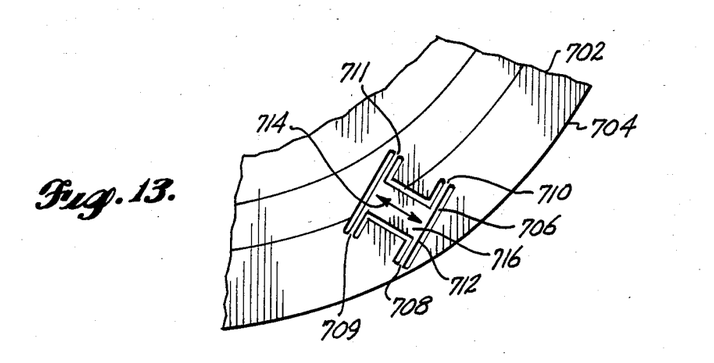
FIG. 13 is a top, plan view of an alternative construction of the pliant element formed as a pair of opposing webs which provide suspension for a cubic contacting element.

FIG. 13 is a top, plan view of an alternative construction of the pliant element, here indicated generally at 700. Shown is a partial section of the top surface 702 of a stator 704. A recess 706, having a generally cubic shape, is cut through the top surface 702 of stator 704. Four webs 708–711 are integral at one end with the stator 704 and project at their remaining ends into the recess 706. The webs 708–711 mate with, and are integral with a contact element 712. Contact element 712 is generally cubic in shape and is dimensioned such that there is a gap around contact element 712 within recess 706. As shown, each web 708–711 attaches to a midface of contact element 712. The webs 708–711 are designed to be pliant along an axis indicated at 714. The webs 708–711 are otherwise relatively rigid in their axes orthogonal to pliant axis 714. Pliant axis 714, as described hereinabove, is aligned with a predetermined point.

The upper surface 716 of contacting element 712 is designed to abuttingly mate with the proof mass contact pad (not shown). Abutting the top surface of the same proof mass contact pad is a corresponding pliant element to that shown at 700. The clamping together of the stators and proof mass produces a force on the upper surface 716 of contact element 712 which transmits to the webs 708–711 as a shear. As such, the pliant element 700 of FIG. 13 is not subject to compressive buckling, as are other disclosed embodiments wherein a beam element is subject to a compression preload.

As the webs 708–711 deflect small distances along their pliant axis 714, the top surface 716 of contact element 712 remains in abutting relationship with the corresponding contact pad on the proof mass assembly. As such, the pliant element 700 does not induce error producing torques on the proof mass assembly. Also, the relatively wide spacing of the load carrying members and the large surface area of the upper surface 716 of contact element 712, along with the corresponding surface area of the opposing pliant element on the upper stator, operate to minimize induced torques on the proof mass due to axial misalignment between the two pliant elements.

Figure 14:
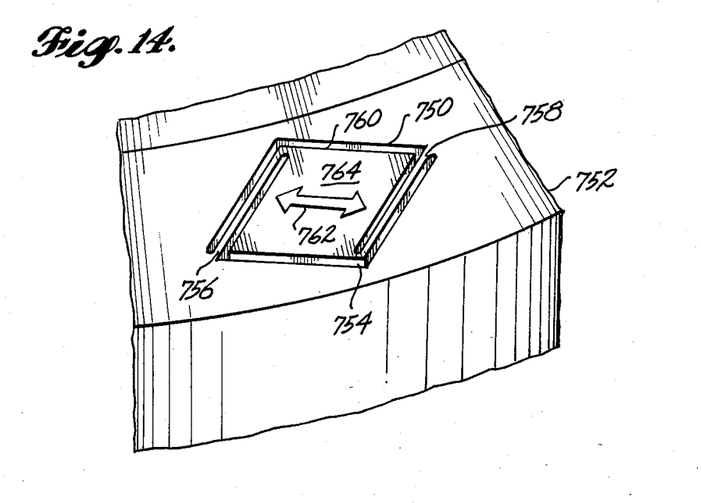
FIG. 14 is perspective view showing an alternative construction of the pliant element here formed with webs which contact the edge portions of a cubic contacting element.

FIG. 14 illustrates an alternative embodiment of the pliant element, here indicated generally at 750 which is similar to the pliant element shown in FIG. 13. FIG. 14 is a perspective view of a portion of stator 752 which has a recess 754 provided therein. A pair of webs 756, 758 connect, and are integral with end walls of the recess 754. The recess 754 is generally rectangular in cross section, with webs 756, 758 projecting along opposite sides of the rectangular, being connected to the stator 752 at diagonal corners thereof. The projecting ends of the webs 756, 758 attach at diagonal corners of a cubic contact element 760.

The webs 756, 758 are configured such that they are pliant in an axis indicated by arrow 762. The webs 756, 758 are otherwise rigid along the axes orthogonal to pliant axis 762.

Contact element 760 has a top surface 764 which is adapted to abuttingly mate with the lower surface of the contacting pad on the proof mass assembly (not shown). Abutting the upper surface of the proof mass contact pad is a corresponding surface on a contacting element provided in the upper stator (not shown).

Deflections of the webs 756, 758 along their pliant axis 762 to relieve stresses between the stator 752 and the proof mass assembly (not shown) do not create moments on the contact element 760. Rather, the top surface 764 of contact element 760 remains in parallel, abutting relationship with the contact pad on the proof mass assembly. As such, no error inducing torques are coupled from the deflecting contact element 760 to the proof mass. In addition, due to the wide spacing of the load carrying members and the large surface area of the upper surface 764 of contact element 760, and its corresponding pliant element in the upper stator, moments coupled to the proof mass assembly due to axial misalignment of the contact elements are minimized, or eliminated.

With both the embodiments shown in FIGS. 13 and 14, it should be noted that the stiffness of the proof mass assembly prevents any tipping motions of the contact elements 712, 760. Also, it will be understood that each of the embodiments of FIGS. 13 and 14 may be formed by a through-cut in the corresponding stators 704, 752. Thus, the embodiments of FIGS. 13 and 14 may be formed by any suitable cutting means.

Figure 15:
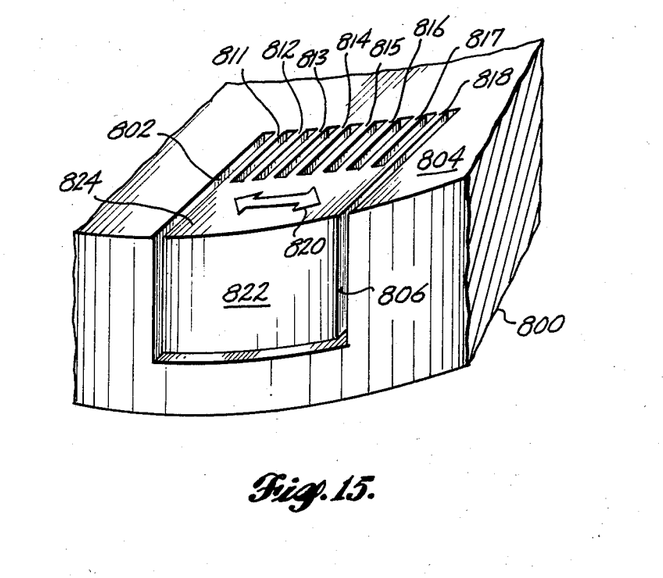
FIG. 15 is a perspective view illustrating an alternative construction of the pliant element wherein a series of cantilevered beam elements join to a common contacting element.

FIG. 15 is a perspective view of a portion of a stator 800 having formed integrally therein a pliant element, indicated generally at 802. Formed through the top surface 804 of stator 800 is a generally rectangular recess 806. Projecting from the innermost end wall of recess 806 are eight beam elements 811–818. In this embodiment of the invention, the beam elements 811–818 are formed integrally with stator 800. The beam elements 811–818 are predeterminedly spaced apart, and aligned in parallel. The beam elements 811–818 are pliant in an axis indicated by double headed arrow 820, being otherwise relatively rigid in the axes orthogonal to pliant axis 820.

Attached to, and integral with the projecting end portions of beam elements 811–818 is a contact element 822. Contact element 822 is generally cubic in shape, being dimensioned such that there is a gap between contact element 822 and the side walls of the recess 806.

Contact element 822 has a top surface 824 which is positioned to mate with a lower surface of a contact pad provided on the proof mass assembly (not shown). The top surface of the contact pad is in abutting relationship with a pliant element formed in the upper stator (not shown), which pliant element is similar to pliant element 802.

The beam elements 811–818 deflect along their pliant axis 820 to relieve stresses produced between the proof mass assembly and the stator 800. This deflection does not produce rotation of contact element 822 which maintains its top surface 824 in parallel abutting alignment with the contact pad on the proof mass assembly.

In addition, the area of the top surface 824 of contact element 822 is sufficiently wide and the beam elements are sufficiently spaced such that any axial misalignments beteen top surface 824 and the corresponding top surface of the upper stator pliant element does not produce a significant misalignment torque on the proof mass assembly. The pliant element 802 of the embodiment shown in FIG. 15 minimizes errors in the transducer induced by torques coupled between the pliant elements and the proof mass assembly.

Figures 16A, 16B, 17:
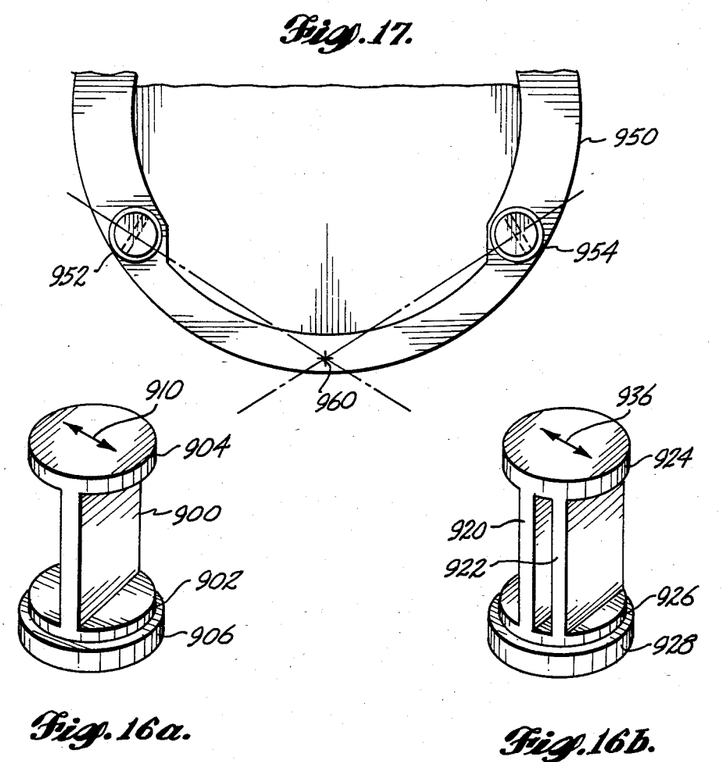

FIGS. 16a, 16b show alternative constructions of the pliant elements here formed as individual components which may be mounted within the transducer assembly to provide a pliant mounting between the proof mass and the stators. FIG. 16a depicts a single beam 900 which is integral at one end with a circular base portion 902 and is integral at its remaining end with a circular top portion 904. Base portion 902 is shown mounted to a pedestal 906. Beam member 900 is formed to be pliant along an axis 910, being otherwise rigid along its axes orthogonal to axis 910.

FIG. 16b is a perspective view of an alternative configuration of the component pliant element, here employing a pair of parallel, predeterminedly spaced apart beams 920, 922. The beams 920, 922 are integral with a top portion 924 and a bottom portion 926, both of which are generally circular. Bottom portion 926 attaches to a circular pedestal 928. The beams 920, 922 are designed to be pliant along an axis 930, being otherwise rigid along their axes orthogonal to axis 930.

FIG. 17 illustrates the use of either of the component pliant elements shown in FIGS. 16a, 16b in a stator assembly. Here, as shown in top plan view is a portion of a stator 950 which has cylindrical recesses 952, 954 at predetermined positions therein. The diameters of the recesses 952, 954 are larger than the top and bottom portions 904, 902; 924, 926 of the pliant elements shown in FIGS. 16a, 16b, respectively. Either of these pliant elements may be received within the recesses 952, 954 such that their pedestals 906, 928, respectively, are firmly secured to the base of the cylindrical recesses 952, 954. Each component pliant element is rotated such that the pliant axis thereof is aligned with a predetermined point, here indicated at 960. The top surfaces of the top portions 904, 924 of the component pliant elements shown in FIGS. 16a, 16b, respectively, are then positioned in abutting relationship with the contacting pads provided on the proof mass assembly (not shown).

It will be understood that the embodiment of FIG. 16b which utilizes the two beam elements 920, 922 reduces error inducing moments between the pliant element and the proof mass assembly as otherwise caused by the single beam pliant element of FIG. 16a inasmuch as deflection of the beams 920, 922 along their pliant axis will not create a rotation of the top surface of the top portion 924. As such, the top surface of top portion 924 will be maintained in parallel abutting relationship with the contacting pad on the proof mass assembly.

Also, it is preferable that the spacing between beams 920 and 922 of the component pliant elements shown in FIG. 16b be sufficiently wide such that an axial misalignment between the pliant elements in the lower and upper stators does not produce an error inducing torque in the proof mass assembly.

It will be understood by one of ordinary skill in the art that with respect to the above described various preferred embodiments of the invention, an assumption is made that the stator, proof mass assembly outer annular support and the pliant element in its axes which are orthogonal to the pliant axis are all infinitely rigid. Inasmuch as in practice each of these components exhibits less than infinite rigidity, the actual alignment of the pliant elements and the resulting stable points, in a given implementation, may be slightly different than the theoretical, infinitely rigid assumed case, and such design deviations are fully within the scope of this invention.

Further, one of ordinary skill in this art will understand that the physical dimensions of a particular beam member and the number of beams in a pliant element are a function of several design parameters including the desired compliance in the X axis and rigidity in the orthogonal Y and Z axis, and the physical properties of the material from which the beam member is formed and, as such, will vary for different applications.

In summary, an improved suspension system for a transducer, e.g., an accelerometer, has been described. The suspension system is readily adaptable to provide a desired strain response.

While preferred embodiments of the invention have been described in detail, many modifications and variations thereto are possible, all of which fall within the true spirit and scope of the invention.

The embodiments of the invention in which an exclusive property or privilege is claimed are defined as follows:

1. A transducer comprising:
 a proof mass including a mass element suspended from a support member for movement with respect thereto;
 a stator means for supporting said proof mass; and
 mounting means for mounting the proof mass to the stator means, the mounting means including at least one pliant element positioned to provide a mechanical connection between adjacent points on the proof mass and the stator means, the pliant element having a pliant axis and being substantially rigid along axes orthogonal to the pliant axis, such that the pliant element deforms to provide relative movement between the proof mass and the stator means due to displacements such as thermal strains.

2. The transducer of claim 1, wherein the mounting means includes a plurality of pliant elements, each pliant element providing a mechanical connection between respective adjacent points of the proof mass and the stator means, each pliant element having a pliant axis and being substantially rigid along axes orthogonal to its pliant axis, the pliant elements being positioned such that their pliant axes intersect at a predetermined point, which point thereby becomes a relatively stable point between the proof mass and the stator means, whereby the pliant elements deform to provide relative movement between the proof mass and the stator means due to displacements such as thermal strains at all points other than said stable point.

3. The transducer of claim 2, wherein the mounting means comprises a pair of pliant elements, and wherein the proof mass and the stator means are in contact with one another at the predetermined point.

4. The transucer of claim 3, wherein said mass element includes a capacitive plate portion provided on a surface thereof and wherein said pair of pliant elements are positioned on a line which extends through the centroid of said capacitive plate portion.

5. The transducer of claim 2, wherein the proof mass further comprises a torquer coil mounted on one side of the mass element, and the stator means comprises a stator having a magnetic pole piece which is coaxially aligned with the torquer coil, and wherein the pliant elements are positioned such that each pliant axis extends through the longitudinal axis of the magnetic pole piece, whereby the torquer coil is maintained in substantial alignment with the pole piece despite thermally induced stresses between the proof mass and the stator means.

6. The transducer of claim 5, wherein the mounting means comprises three pliant elements, wherein two of the pliant elements are positioned on a first line which extends through the longitudinal axis of the magnetic pole piece, and wherein the third pliant element is positioned on a second line which extends through the longitudinal axis of the magnetic pole piece and is orthogonal to said first line.

7. The transducer of claim 5, wherein the mounting means comprises three pliant elements, wherein said mass element has a capacitive plate portion provided on a surface thereof, wherein two of said pliant elements are positioned on a first line which extends through the centroid of said capacitive plate portion, the third pliant element being positioned on a second line that is orthogonal to said first line, the pliant axes of the three pliant elements all extending through the longitudinal axis of the magnetic pole piece.

8. The transducer of claim 2, wherein the proof mass further comprises a torquer coil mounted on one side of the mass element, and the stator means comprises a stator having a magnetic pole piece which is predeterminedly positioned with respect to the torquer coil, the magnetic pole piece and torquer coil exhibiting a known flux density-temperature characteristic;

and wherein the predetermined point is selected such that thermally induced relative movement between the torquer coil and the magnetic pole piece compensates for said flux density-temperature characteristic.

9. The transducer of claim 8, wherein the mounting means comprises three pliant elements, the pliant axis of each pliant element intersecting the predetermined point, two pliant elements being positioned along a first line and the third pliant element and the predetermined point being positioned along a second line that extends through the longitudinal axis of the magnetic pole piece and is orthogonal to said first line.

10. The transducer of claim 9, wherein said mass element has a capacitive plate portion provided on a surface thereof, and wherein the first line extends through the centroid of said capacitive plate portion.

11. The transducer of claim 1, wherein said pliant element is formed integrally with said stator means.

12. The transducer of claim 1, wherein said pliant element is formed as a component piece having a base portion, a top portion and a beam member joined to said base portion and said top portion, said beam member being pliant along the pliant axis and relatively rigid in its axes orthogonal to said pliant axis, and wherein said stator means includes means for receiving and securing said pliant element component piece thereto such that the top surface of said top portion is positioned to form the mechanical connection with said proof mass.

13. The transducer of claim 1, wherein said pliant element comprises:
first and second spaced apart beam members, each beam member having a bending axis aligned with the pliant axis, said pliant element having a top surface for mating with said proof mass, said top surface remaining substantially parallel to the opposing surface of said proof mass with deflection of said beam members along said pliant axis.

14. The transducer of claim 1, wherein:
said proof mass mounts to said stator means in abutting contact against a mating surface thereof;
said stator means has a recess provided in said mating surface; and
said pliant element comprises at least one beam element having first and second ends, the first end of the beam element being affixed to the sidewall of said stator recess, the second end of said beam element projecting into said recess, and a contacting element affixed to the second end and suspended within said recess thereby, said contacting element having a top surface which abuts with said proof mass for forming the mechanical connection between said stator means and said proof mass.

15. The transducer of claim 14, wherein the beam element is attached to said contacting element at a midface portion thereof.

16. The transducer of claim 14, wherein the beam element is attached to said contacting element at an edge thereof.

17. The transducer of claim 1 wherein:
said proof mass mounts to said stator means in abutting contact against a mating surface thereof;
said stator means has a recess provided in said mating surface; and
said pliant element comprises a plurality of beam elements, each beam element being affixed at one end thereof to a sidewall of said recess, the remaining end of each beam element projecting into said stator recess, the beam elements being spaced apart and positioned in parallel with the bending axis of each beam element being aligned with a predetermined point, and a contacting element affixed to the projecting ends of said plurality of beam elements for the suspension of said contacting element in said recess thereby, said contacting element having a top surface which abuts with said proof mass for forming the mechanical connection between the stator means and said proof mass.

18. The transducer of claim 1, wherein the proof mass lies substantially in a plane and comprises opposed upper and lower surfaces, wherein the stator means comprises upper and lower stators, and wherein the mounting means includes at least one upper pliant element positioned to provide a mechanical connection between adjacent points on the upper surface of the proof mass and the upper stator means, and at least one lower pliant element positioned to provide a mechanical connection between adjacent points on the lower surface of the proof mass and the lower stator means, each pliant element having a pliant axis and being substantially rigid along axes orthogonal to its pliant axis, the pliant axes being oriented to intersect at a predetermined point in said plane, whereby the pliant elements deform to provide relative movement between the proof mass and the stator means due to displacement such as thermal strains.

19. The transducer of claim 18, wherein the mounting means comprises a pair of upper pliant elements and a pair of lower pliant elements, and wherein the pliant elements are arranged such that each upper pliant element contacts the upper surface of the proof mass at a point opposite the point of contact between a corresponding lower pliant element and the lower surface of the proof mass, the pliant elements being positioned such that their pliant axes intersect at a predetermined point in said plane, which point thereby becomes a relatively stable point between the proof mass and the stator means, whereby the pliant elements deform to provide relative movement between the proof mass and the stator means due to displacement such as thermal strains at all points other than said stable point.

20. The transducer of claim 19, wherein the proof mass is in contact with each stator at the predetermined point.

21. The transducer of claim 19, wherein the proof mass further comprises upper and lower torquer coils mounted on opposite sides of the mass element, wherein the upper and lower stators comprise upper and lower magnetic pole pieces coaxially aligned with the torquer coils, and wherein the pliant elements are positioned such that each pliant axis extends through the longitudinal axis of the magnetic pole pieces, whereby the torquer coils are maintained in substantial alignment with the pole pieces despite thermally induced stresses between the proof mass and the stator means.

22. The transducer of claim 19, wherein the proof mass further comprises upper and lower torquer coils mounted on opposite sides of the mass element, wherein the upper and lower stators respectively comprise upper and lower pole pieces that are predeterminedly positioned with respect to the torquer coils, the magnetic pole pieces and the torquer coils exhibiting a known flux density-temperature characteristic; and wherein the predetermined point is selected such that thermally induced relative movement between the torquer coils and the magnetic pole pieces compensates for said flux density-temperature characteristic.

23. The transducer of claim 19, wherein:
the surfaces of said pliant elements in contact with the proof mass have a predetermined surface area such that a torque imparted to said proof mass due to axial misalignment of corresonding upper and lower pliant elements is minimized.

24. A transducer comprising:
a proof mass including:
a flapper element suspended from an outer annular support for pendulous movement with respect thereto, the flapper element and annular support being an integral unit, the annular support having predeterminedly positioned pads projecting therefrom;
a pair of torquer coils mounted to opposite sides of the flapper element; and
upper and lower stators for supporting the proof mass on opposite surfaces thereof, each stator comprising magnetic pole pieces which are aligned in magnetic circuit configuration with the torquer coils, the stators having a plurality of pliant elements formed therein, each pliant element having one pliant axis while being substantially rigid to forces along axes orthogonal to said pliant axis, each pliant element being positioned for abutment with a corresponding pad on the annular support with its pliant axis extending through a predetermined reference point, said reference point selected to both relieve thermally induced stress between the proof mass and the stators by deformation of the pliant elements and resist moments about said predetermined reference point.

25. The transducer of claim 24, wherein the pliant elements are positioned such that said reference point is predeterminedly located on the annular support to provide maximum compliance to thermally induced strains and rigid support of the proof mass to seismic loads.

26. The transducer of claim 24, wherein the longitudinal axes of the torquer coils are coincident with the longitudinal axes of the magnetic pole pieces and wherein the pliant elements are positioned such that said reference point is located on said coincident axes, whereby the torquer coils are maintained in alignment with the magnetic pole pieces despite thermally induced stresses between the proof mass and the annular support.

27. The transducer of claim 24, wherein the pliant elements are positioed such that said reference point is located to produce a predetermined movement between the torquer coils and the magnetic pole pieces with temperature change to compensate for thermally induced magnetic flux variations between the torquer coils and the magnetic pole pieces.

28. The transducer of claim 24, wherein each pliant element has a top surface which abuts said annular support pad, said pliant element including means for maintaining said top surface in parallel contacting engagement with said annular support pad over deflections of said pliant element in its pliant axis.

* * * * *

UNITED STATES PATENT AND TRADEMARK OFFICE
CERTIFICATE OF CORRECTION

PATENT NO. : 4,592,234

DATED : June 3, 1986

INVENTOR(S) : Brian L. Norling

It is certified that error appears in the above-identified patent and that said Letters Patent is hereby corrected as shown below:

Abstract, line 16, "compounds" should be --components--

Column 3, line 65, "stator" should be --stators--

Column 7, line 44, "surface" should be --surfaces--

Column 7, line 45, "arrange ment" should be --arrangement--

Column 9, line 41, delete "404"

Column 10, line 41, "minimizes" should be --minimize--

Column 10, line 58, "beam" should be --beams--

Column 11, line 62, insert --,-- (comma) after "750"

Column 12, line 1, "rectangular" should be --rectangle--

Column 13, line 4, "beteen" should be --between--

Column 14, line 14, "axis" should be --axes--

Column 14, line 61, "transucer" should be --transducer--
(Claim 4, Line 1)

UNITED STATES PATENT AND TRADEMARK OFFICE
CERTIFICATE OF CORRECTION

PATENT NO. : 4,592,234

DATED : June 3, 1986

INVENTOR(S) : Brian L. Norling

It is certified that error appears in the above-identified patent and that said Letters Patent is hereby corrected as shown below:

Column 17, line 41, "corresonding" should be --corresponding--
(Claim 23, line 5)

Column 18, line 37; "positioed" should be --positioned--
(Claim 27, line 2)

Signed and Sealed this

Twenty-third Day of September 1986

[SEAL]

Attest:

DONALD J. QUIGG

Attesting Officer

Commissioner of Patents and Trademarks